US009110527B2

(12) United States Patent
Bi et al.

(10) Patent No.: US 9,110,527 B2
(45) Date of Patent: Aug. 18, 2015

(54) CONDITION BASED CONTROLS FOR A DISPLAY BASED ON AT LEAST ONE OPERATING PARAMETER

(71) Applicant: APPLE INC., Cupertino, CA (US)

(72) Inventors: Yafei Bi, Palo Alto, CA (US); Thomas J. Wilson, Pleasanton, CA (US); Wei H. Yao, Palo Alto, CA (US); Hopil Bae, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 357 days.

(21) Appl. No.: 13/738,712

(22) Filed: Jan. 10, 2013

(65) Prior Publication Data

US 2013/0328799 A1 Dec. 12, 2013

Related U.S. Application Data

(60) Provisional application No. 61/657,699, filed on Jun. 8, 2012.

(51) Int. Cl.
*G06F 3/041* (2006.01)
*G09G 5/00* (2006.01)
G09G 3/36 (2006.01)
G09G 5/18 (2006.01)

(52) U.S. Cl.
CPC .............. *G06F 3/041* (2013.01); *G09G 5/003* (2013.01); *G09G 3/3611* (2013.01); *G09G 5/18* (2013.01); *G09G 2320/0693* (2013.01); *Y10T 29/49002* (2015.01)

(58) Field of Classification Search
CPC .......... G06F 3/041–3/047; G06F 2203/04103; G06F 2203/04104; G09G 5/00; G09G 2320/04; G09G 2320/041
USPC .......... 345/173–178; 29/592.1, 593; 73/866.3
See application file for complete search history.

(56) References Cited

U.S. PATENT DOCUMENTS

| 6,678,834 | B1 * | 1/2004 | Aihara et al. .................. 345/212 |
| 7,952,565 | B2 | 5/2011 | Park et al. |
| 2010/0141669 | A1 * | 6/2010 | Sadahiro ....................... 345/589 |
| 2010/0177060 | A1 | 7/2010 | Han |
| 2010/0214238 | A1 | 8/2010 | Christoph et al. |
| 2011/0248963 | A1 | 10/2011 | Lawrence et al. |
| 2011/0298746 | A1 * | 12/2011 | Hotelling ...................... 345/174 |

* cited by examiner

*Primary Examiner* — Nathan Danielsen
(74) *Attorney, Agent, or Firm* — Fletcher Yoder PC (57) ABSTRACT

A system, method, and device for increasing uniformity between displays incorporating components from different manufacturers. Incorporating components from different manufactures in different displays may cause the different displays to appear differently even under similar conditions. By modifying the operating parameters used to drive the display according to performance characteristics for various conditions, displays incorporating components from different manufacturers may be configured to produce a substantially similar picture under similar conditions. The various conditions may include stimulus information, such as temperature or touch activity.

20 Claims, 10 Drawing Sheets

CONDITION BASED CONTROLS FOR A DISPLAY BASED ON AT LEAST ONE OPERATING PARAMETER

CROSS REFERENCE TO RELATED APPLICATIONS

This application is a Non-Provisional Patent Application of U.S. Provisional Patent Application No. 61/657,699, entitled "Condition Based Controls for a Display", filed Jun. 8, 2012, which are herein incorporated by reference.

BACKGROUND

The present disclosure relates generally to controlling the operating parameters of an electronic device display.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Visual displays are commonly used for a wide variety of electronic devices, including such consumer electronics as computers and handheld devices (e.g., cellular telephones, audio and video players, gaming systems, and so forth). Such displays typically provide a flat display using display circuitry in a relatively thin package that is suitable for use in a variety of electronic goods. In addition, such displays often incorporate touch sensing circuitry. Furthermore, the incorporated touch sensing circuitry may be multiplexed with the display circuitry to enable display and touch sensing using one element of the display. By multiplexing the display and touch sensing circuitry into one element, the element must alternate between a display state and a touch sensing state.

Often, the number of displays produced may exceed the manufacturing capability of one or more manufacturers. Therefore, it is common for electronic displays to include components from various manufacturers. A problem may arise due to a lack of uniformity of the components manufactured by the different suppliers. In other words, display components from different manufacturers may respond differently to similar signals even under similar conditions. Thus, if the displays do not incorporate techniques for adjusting to the variance in components, a display utilizing components from one manufacturer may appear to display an image in a substantially different manner than a display utilizing components from another manufacturer. Accordingly, there is a need for condition based controls for a display.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

A system, method, and device for increasing uniformity between displays incorporating components manufactured by different manufacturers is described. Incorporating components from different manufactures in different displays may cause the different displays to function differently, even when operating under similar conditions. By modifying the operating parameters used to drive the display, for example, according to performance characteristics for various conditions, displays incorporating components from different manufacturers may produce substantially similar images under similar conditions. The various conditions may include stimulus information, such as temperature of or touch activity on a touch display.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain embodiments of the present disclosure are directed to production of electronic displays. When large quantities of displays are manufactured, the demand for components may not be met by one lot of components from a manufacturer or even by one manufacturer. Due to different manufacturing tolerances among manufacturers and varying quality of materials between manufactured lots, similar display components may have different responses to similar signals under similar conditions (e.g., temperatures). Due to these varied responses of the components, electronic displays may display an image in a substantially different manner in response to similar signals under certain conditions. To achieve uniformity of display quality between electronic displays incorporating components from different manufacturers or lots, an adaptively driven display may be used. The adaptive displays increase uniformity by adaptively driving the display using various operating parameters selected from memory based on various conditions. For example, one technique includes measuring performance characteristics of displays under certain temperatures and/or touch activities. These performance characteristics are used to select values for operating parameters of the displays to achieve desired display characteristics. Using the selected values to drive the displays, the displays may substantially emit substantially uniform display characteristics.

Figure 1:
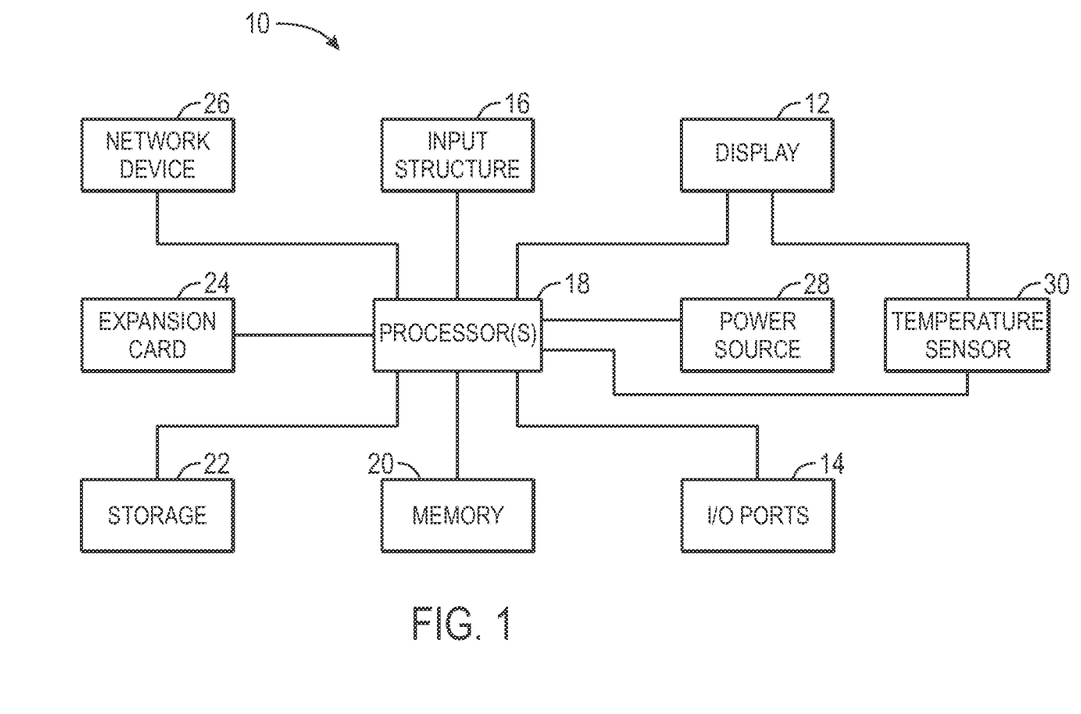
FIG. 1 is a block diagram of an electronic device in accordance with aspects of the present disclosure.

As may be appreciated, electronic devices may include various internal and/or external components which contribute to the function of the device. For instance, FIG. 1 is a block diagram illustrating components that may be present in one such electronic device 10. Those of ordinary skill in the art will appreciate that the various functional blocks shown in FIG. 1 may include hardware elements (including circuitry), software elements (including computer code stored on a computer-readable medium, such as a hard drive or system memory), or a combination of both hardware and software elements. FIG. 1 is only one example of a particular implementation and is merely intended to illustrate the types of components that may be present in the electronic device 10. For example, in the presently illustrated embodiment, these components may include a display 12, input/output (I/O) ports 14, input structures 16, one or more processors 18, one or more memory devices 20, nonvolatile storage 22, expansion card(s) 24, networking device 26, power source 28, and temperature sensor 30.

The display 12 may be used to display various images generated by the electronic device 10. The display 12 may be any suitable display, such as a liquid crystal display (LCD) or an organic light-emitting diode (OLED) display. Additionally, in certain embodiments of the electronic device 10, the display 12 may be provided in conjunction with a touch-sensitive element, such as a touchscreen, that may be used as part of the control interface for the device 10.

The I/O ports 14 may include ports configured to connect to a variety of external devices, such as a power source, headset or headphones, or other electronic devices (such as handheld devices and/or computers, printers, projectors, external displays, modems, docking stations, and so forth). The I/O ports 14 may support any interface type, such as a universal serial bus (USB) port, a video port, a serial connection port, an IEEE-1394 port, a speaker, an Ethernet or modem port, and/or an AC/DC power connection port.

The input structures 16 may include the various devices, circuitry, and pathways by which user input or feedback is provided to processor(s) 18. Such input structures 16 may be configured to control a function of an electronic device 10, applications running on the device 10, and/or any interfaces or devices connected to or used by device 10. For example, input structures 16 may allow a user to navigate a displayed user interface or application interface. Non-limiting examples of input structures 16 include buttons, sliders, switches, control pads, keys, knobs, scroll wheels, keyboards, mice, touchpads, microphones, and so forth. Additionally, in certain embodiments, one or more input structures 16 may be provided together with display 12, such an in the case of a touchscreen, in which a touch sensitive mechanism is provided in conjunction with display 12.

Processors 18 may provide the processing capability to execute the operating system, programs, user and application interfaces, and any other functions of the electronic device 10. The processors 18 may include one or more microprocessors, such as one or more "general-purpose" microprocessors, one or more special-purpose microprocessors or ASICS, or some combination of such processing components. For example, the processors 18 may include one or more reduced instruction set (RISC) processors, as well as graphics processors, video processors, audio processors, and the like. As will be appreciated, the processors 18 may be communicatively coupled to one or more data buses or chipsets for transferring data and instructions between various components of the electronic device 10.

Programs or instructions executed by processor(s) 18 may be stored in any suitable manufacture that includes one or more tangible, computer-readable media at least collectively storing the executed instructions or routines, such as, but not limited to, the memory devices and storage devices described below. Also, these programs (e.g., an operating system) encoded on such a computer program product may also include instructions that may be executed by the processors 18 to enable device 10 to provide various functionalities, including those described herein.

The instructions or data to be processed by the one or more processors 18 may be stored in a computer-readable medium, such as a memory 20. The memory 20 may include a volatile memory, such as random access memory (RAM), and/or a non-volatile memory, such as read-only memory (ROM). The memory 20 may store a variety of information and may be used for various purposes. For example, the memory 20 may store firmware for electronic device 10 (such as basic input/output system (BIOS)), an operating system, and various other programs, applications, or routines that may be executed on electronic device 10. In addition, the memory 20 may be used for buffering or caching during operation of the electronic device 10.

The components of the device 10 may further include other forms of computer-readable media, such as non-volatile storage 22 for persistent storage of data and/or instructions. Non-volatile storage 22 may include, for example, flash memory, a hard drive, or any other optical, magnetic, and/or solid-state storage media. Non-volatile storage 22 may be used to store firmware, data files, software programs, wireless connection information, and any other suitable data.

The embodiment illustrated in FIG. 1 may also include one or more card or expansion slots. The card slots may be configured to receive one or more expansion cards 24 that may be used to add functionality, such as additional memory, I/O functionality, or networking capability, to electronic device 10. Such expansion cards 24 may connect to device 10 through any type of suitable connector, and may be accessed internally or external to the housing of electronic device 10. For example, in one embodiment, expansion cards 24 may include a flash memory card, such as a SecureDigital (SD) card, mini- or microSD, CompactFlash card, Multimedia card (MMC), or the like. Additionally, expansion cards 24 may include one or more processor(s) 18 of the device 10, such as a video graphics card having a GPU for facilitating graphical rendering by device 10.

The components depicted in FIG. 1 also include a network device 26, such as a network controller or a network interface card (NIC). In one embodiment, the network device 26 may be a wireless NIC providing wireless connectivity over any 802.11 standard or any other suitable wireless networking standard. The device 10 may also include a power source 28. In one embodiment, the power source 28 may include one or more batteries, such as a lithium-ion polymer battery or other type of suitable battery. Additionally, the power source 28 may include AC power, such as provided by an electrical outlet, and electronic device 10 may be connected to the power source 28 via a power adapter. This power adapter may also be used to recharge one or more batteries of device 10.

The electronic device 10 may also include a temperature sensor 30. In one embodiment, the temperature sensor 30 may be used to determine the ambient temperature in or around the device 10. Additionally or alternatively, a temperature sensor 30 may be included to determine the temperature of the display 12. Moreover, the temperature sensor 30 may transmit the temperature measurement to the processor 18 and/or the display 12.

The electronic device 10 may take the form of a computer system or some other type of electronic device. Such computers may include computers that are generally portable (such as laptop, notebook, tablet, and handheld computers), as well as computers that are generally used in one place (such as conventional desktop computers, workstations and/or servers). In certain embodiments, electronic device 10 in the form of a computer may include a model of a MacBook®, MacBook® Pro, MacBook Air®, iMac®, Mac® mini, or Mac® Pro available from Apple Inc. of Cupertino, Calif.

Figure 2:
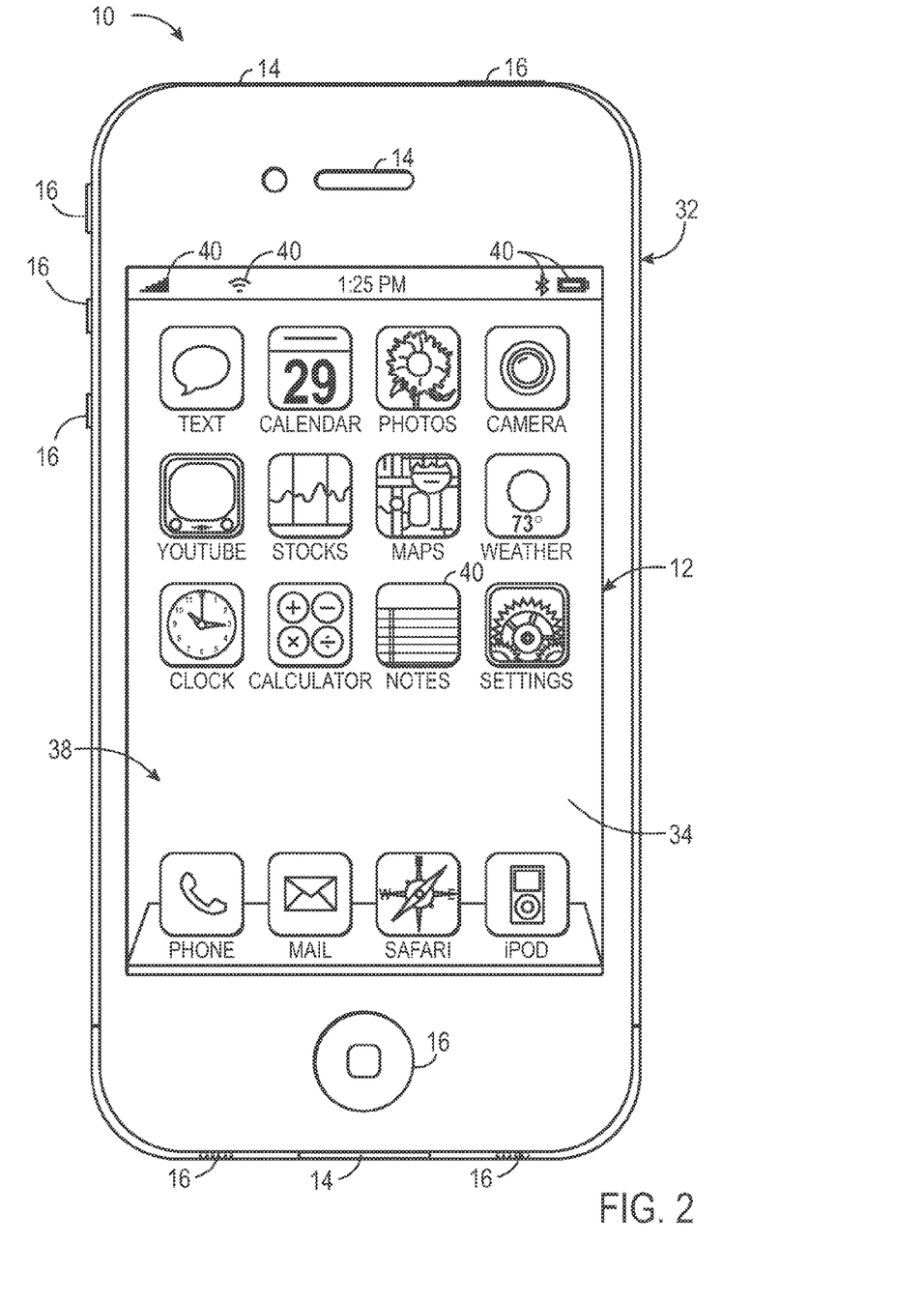
FIG. 2 is a perspective view of a cellular device in accordance with aspects of the present disclosure.
Figure 3:
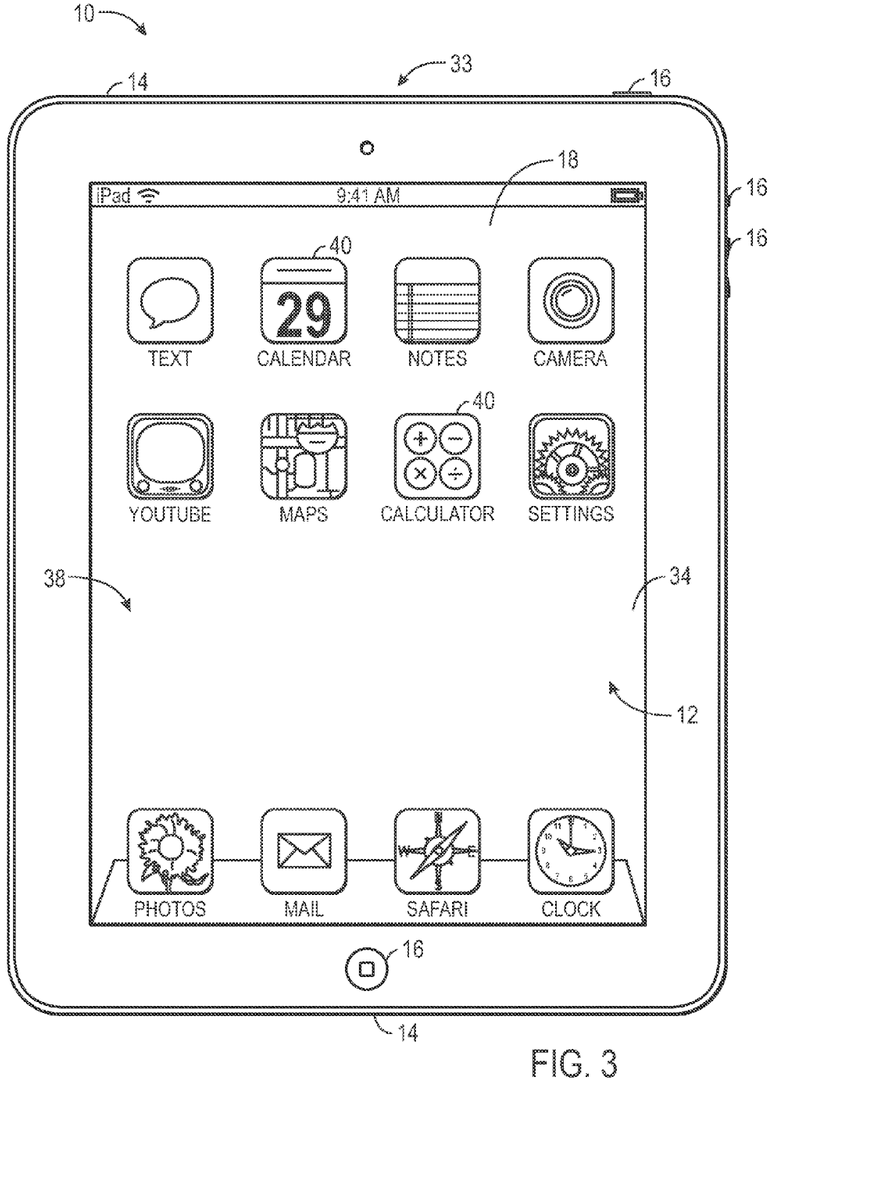
FIG. 3 is a perspective view of a handheld electronic device in accordance with aspects of the present disclosure.

The electronic device 10 may also take the form of other types of electronic devices. In some embodiments, various electronic devices 10 may include mobile telephones, media players, personal data organizers, handheld game platforms, cameras, and combinations of such devices. For instance, as generally depicted in FIG. 2, the device 10 may be provided in the form of a cellular device 32 that includes various functionalities (such as the ability to take pictures, make telephone calls, access the Internet, communicate via email, record audio and video, listen to music, play games, and connect to wireless networks). Alternatively, as depicted in FIG. 3, the electronic device 10 may be provided in the form of a handheld electronic device 33. By way of further example, handheld device 33 may be a model of an iPhone®, iPod®, or iPad® available from Apple Inc. of Cupertino, Calif.

Electronic device 10 of the presently illustrated embodiment includes a display 12, which may be in the form of an LCD 34. The LCD 34 may display various images generated by electronic device 10, such as a graphical user interface (GUI) 38 having one or more icons 40. In one embodiment, the LCD 34 may be a high resolution display with 1000 or more horizontal gate lines present therein. The device 36 may also include various I/O ports 14 to facilitate interaction with other devices, and user input structures 16 to facilitate interaction with a user.

Figure 4:
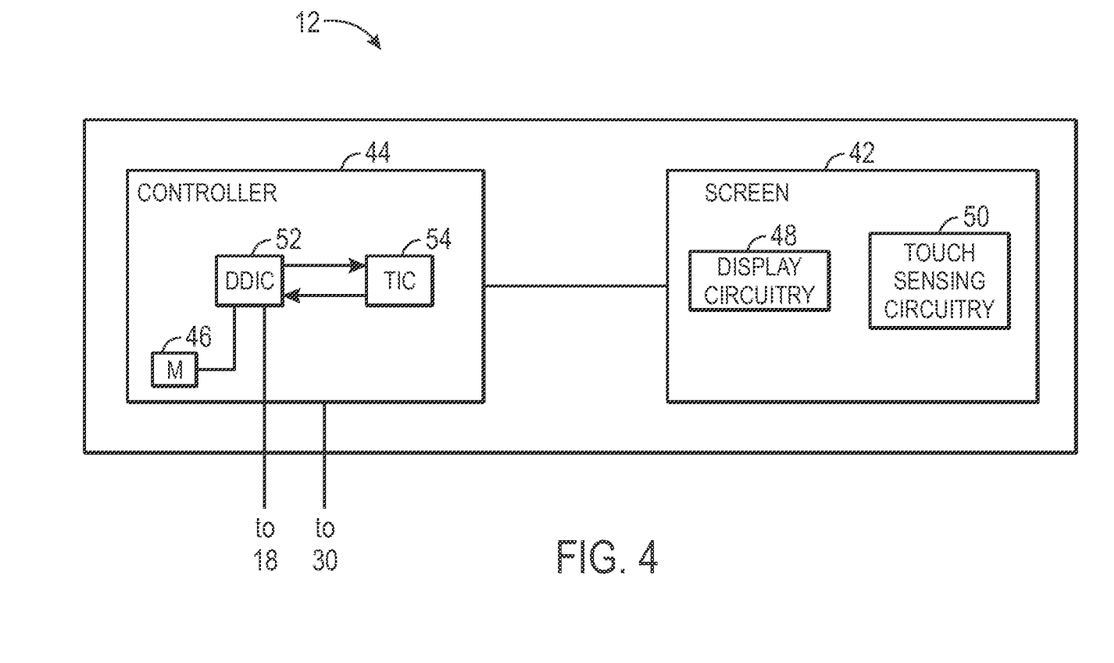
FIG. 4 is a schematic view of a display that may be found in either of the devices of FIG. 1 or FIG. 2 in accordance with aspects of the present disclosure.

One example of a display 12 is depicted in FIG. 4 in accordance with one embodiment. The depicted display 12 includes a screen 42, controller 44, and memory 46. The screen 42 may be any display that utilizes layered materials, such as an LCD display, a polymer organic light-emitting diode (PLED) display, or an OLED display. Further, the screen 42 may include display circuitry 48 and touch sensing circuitry 50. The display circuitry 48 includes an array of pixels manufactured from layered material configured to selectively modulate the amount of color and light transmitted from the electronic device 10. Moreover, portions of the touch sensing circuitry 50 may be integrated into the layered material composing the pixel array. In other words, the screen 42 integrates display circuitry 48 and touch sensing circuitry 50 by sharing at least a portion of electronic components (e.g., electrodes). As discussed below, the shared electronic components are configured to alternate between states for display and sensing touch of a user. That is, during one state, a shared electronic component may function as a portion of the touch sensing circuitry 50 while in another phase, the shared electronic component may function as a portion of the display circuitry 48. As discussed below, the controller 44 may cause the switch between states based on a variety of operating parameters.

The controller 44 includes a display driver integrated circuit (DDIC) 52 and a touch integrated circuit (TIC) 54. The DDIC 52 controls the use of the display circuitry 48, and the TIC 54 controls the use of the touch sensing circuitry 50. Accordingly, as discussed below, the DDIC 44 and the TIC 54 are communicatively connected to enable the controller 44 to manipulate the states of electronic components shared between the display circuitry 48 and the touch sensing circuitry 50 based upon desired characteristics. The memory 46 may be incorporated as dedicated memory within the controller 44. Alternatively, in some embodiments the memory 46 may be incorporated within the DDIC 52 or TIC 54. In other embodiments, the memory 46 may be incorporated within the memory 20. This memory 46 may be utilized by the controller 44 to manipulate the states of electronic components shared between the display circuitry 48 and the touch sensing circuitry 50.

Figure 5:
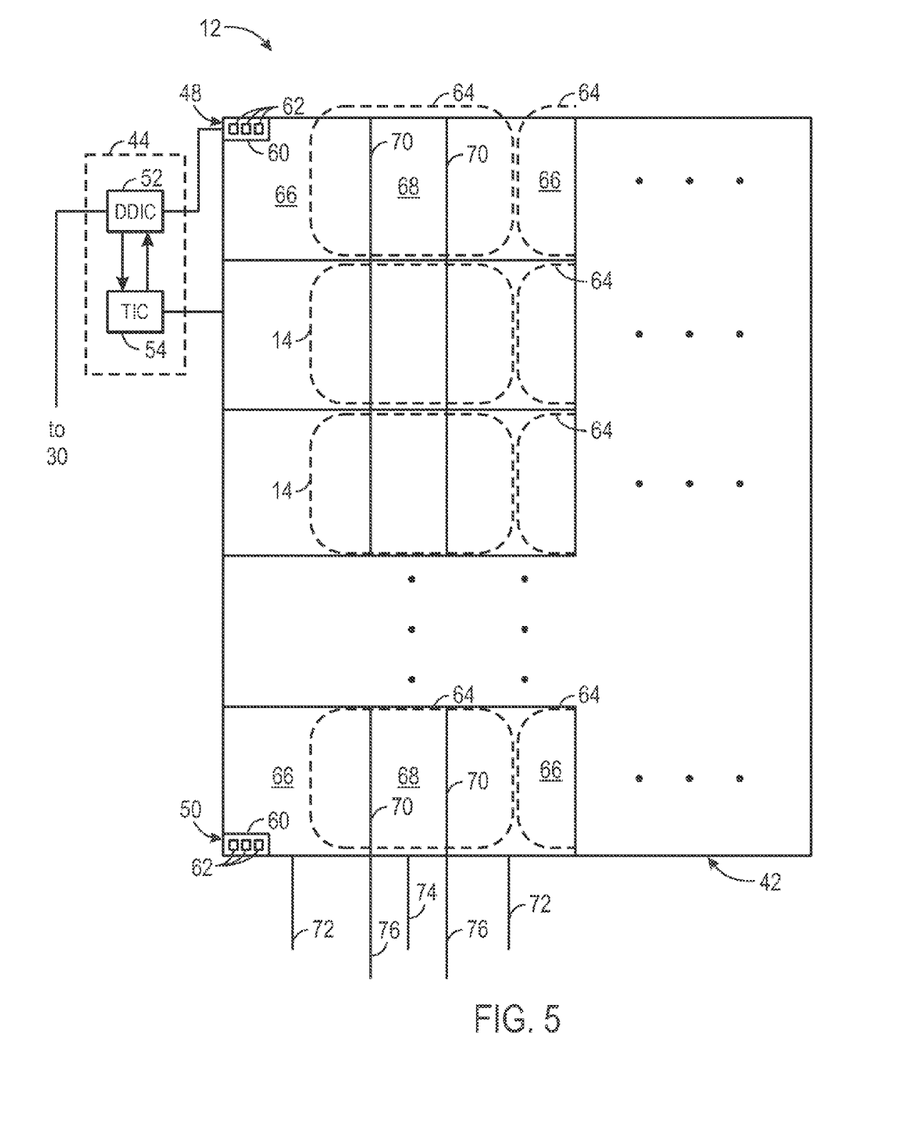
FIG. 5 is a block diagram of circuitry of the display of FIG. 4 in accordance with aspects of the present disclosure.

Referring now to FIG. 5, an example of a detailed view of pixel driving circuitry found in display 12 is provided. As illustrated, the controller 44 includes the DDIC 52 configured to drive the display circuitry 48. The display circuitry 48 includes an array or matrix of display pixels 60 distributed throughout the screen 42. Further, the display pixels 60 include display sub-pixels 62 of multiple colors (e.g., red, green, and blue sub-pixels) arranged to enable each display pixel 60 to emit various colors. Additionally, each display pixel 60 may include various suitable circuits and materials. For example, in some embodiments, each display sub-pixel 62 may include a pixel electrode and a TFT (thin film transistor) to switch the pixel electrode during a display state. The DDIC 52 drives the display pixels 60 and display sub-pixels 62 during a display state to enable the screen 42 to display various images via display circuitry 48.

As depicted, the touch sensing circuitry 50 includes multiple touch sensing pixels 64. One embodiment includes touch sensing pixels 64 composed of portions of drive sections 66 and sense sections 68. As illustrated, each touch sense pixel 64 may include a portion of two drive sections 66, the sense section 68, and guard sense rails 70 therebetween. During a touch sensing state, the TIC 54 drives the drive sections 66 using a drive voltage 72 (Vcom_Tx) during a touch sensing state. The sense sections 68 are electrically insulated from the drive sections 66 by an insulative material. In a touch sensing state, the TIC 54 drives the sense sections 68 using a sense voltage (Vcom_Rx) 74. In certain embodiments, the sense voltage 74 may be supplied at a voltage lower than the drive voltage 72. As may be appreciated, in these embodiments, when the drive sections 66 are powered by the drive voltage 72 across the insulative material, a capacitive circuit is created. When a touch pixel 64 is touched by certain objects (e.g., a finger) during a touch sensing state, the capacitive circuit sends an electrical impulse along the sense section 68. Further, in certain embodiments, the guard sense rails 70 may be supplied a blocking voltage 76 (Vcom_Gs) to reduce video artifacts created by voltage leakage in the circuitry remaining during a change of states in the display 42.

As illustrated, certain embodiments of the screen 42 may include touch sensing pixels 64 overlaid with multiple display pixels 60. For example, certain embodiments may include drive sections 66 that are each overlaid with rows of display pixels 60 each consisting of 30-60 display pixels 60. Similarly, each sense section 68 may be overlaid with 15-30 display pixels 60. In other words, certain embodiments include sense sections 68 consisting rows that include half as many columns of display pixels 60 as drive sections 66 include. In other embodiments, the sense sections 68 may include rows consisting of a number of display pixels 60 equal to or greater than the number of display pixels 60 included in the rows of drive sections 66. Further, other embodiments of the screen 42 may include drive sections 66 and sense sections 68 overlaid with rows or columns consisting of any suitable number of display pixels 64. By integrating display pixels 60 and touch sensing pixels 64 as discussed above, the display 12 may be a touch display that allows for both receiving of touch inputs from a user as well as displaying images.

Figure 6:
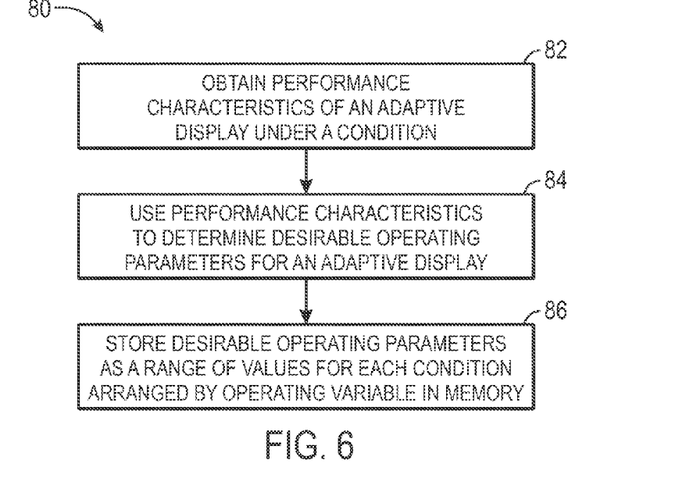
FIG. 6 is a flow chart representative relating to generation and storage of operating parameters for the display of FIG. 4 in accordance with aspects of the present disclosure.

FIG. 6 illustrates a flow chart representing a method 80 for storing operating parameters for using to drive the display 12. In the illustrated embodiment, the method 80 includes the obtaining a performance characteristic of the display 12 (block 82) under certain conditions. In some embodiments, these characteristics may be determined under certain conditions, such as under certain temperatures and/or while various amounts of touch activities are performed. The obtained performance characteristics may include certain display attributes for the screen 42 (e.g., picture quality, brightness, contrast ratio, response time, display lag, etc.), touch response of the screen 42, electronic characteristics of the display circuitry 48, electronic characteristics of the touch sensing circuitry 50, and/or electronic characteristics of other circuitry or components of the display 12. For example, one embodiment of the method 80 may include obtaining the signal response of the display circuitry 48 to various inputs from the DDIC 52. Moreover, these characteristics may be obtained at various occasions. For example, some embodiments of the method 80 may include obtaining the performance characteristics once for each display 12 or per lot of manufactured components from each manufacturer. Certain embodiments may obtain the performance characteristics only once per manufacturer or may obtain the performance characteristics of the display 12 once per a predetermined period. For example, in some embodiments, the method 80 may include obtaining the performance characteristics on a period based on the number of displays manufactured (e.g., obtain the operating characteristics every 1,000 display units manufactured). Alternatively, in other embodiments, the performance characteristics may be obtained on a period based on a period of time (e.g., obtain the operating characteristics once per hour).

Figure 7:
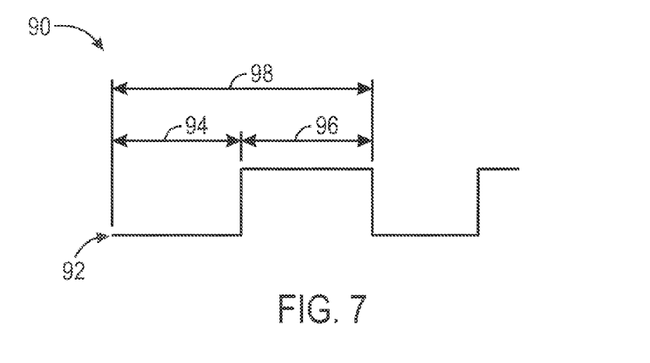
FIG. 7 is a graph illustrating a slew rate as an operating parameter of the display of FIG. 4 in accordance with aspects of the present disclosure.

Additionally, the method 80 includes using the obtained performance characteristics to determine desirable operating parameters for an adaptive display 12 (block 84). The operating parameters may consist of various changes to the electrical signals transmitted by the controller 44 under certain conditions (e.g., temperature, touch activity) to produce a desired video quality or uniformity of displays between multiple devices 10. In one embodiment, the operating parameters may include calculating or testing to determine a value for each operating parameter to achieve a particular display characteristic. The operating parameters may include changing the electrical transmissions from the controller 44. For example, FIG. 7 illustrates an embodiment of measuring an operating parameter as the slew rate (SR) 90 of the display 12.

The slew rate 90 illustrates a state of transmission by either the DDIC 52 or the TIC 54 during the display state and touch sensing state. For example, the transmission state graph 92 may illustrate the state of transmission from the DDIC 52 to the display circuitry 48. In other words, the DDIC 52 will not transmit to the display circuitry 48 during the touch sensing state 94 (e.g., inactive state). However, during the display state 96 (e.g., active state), the DDIC 52 may transmit to the display circuitry 48. As can be appreciated, the state of transmission from the TIC 54 to the touch sensing circuitry 50 may be an inverted graph of the illustrated transmission state graph 92. In other words, the slew rate 90 describes the rate at which the controller 44 may alternate between a display state 96 and the touch sensing state 96. The slew rate 90 also includes the period 98 having a touch sensing state 94 and a display state 96. Moreover, the period 98 may occur at any suitable frequency (e.g., 60 Hz). Additionally, in the illustrated embodiment, the period 98 includes a touch sensing state 94 and a display state 96 of equal duration. However, in some embodiments, the touch sensing state 94 may have a longer or shorter duration than that of the display state 96. In the various embodiments, an increase in slew rate 90 increases corresponds to a decrease in the period 98.

Figure 8:
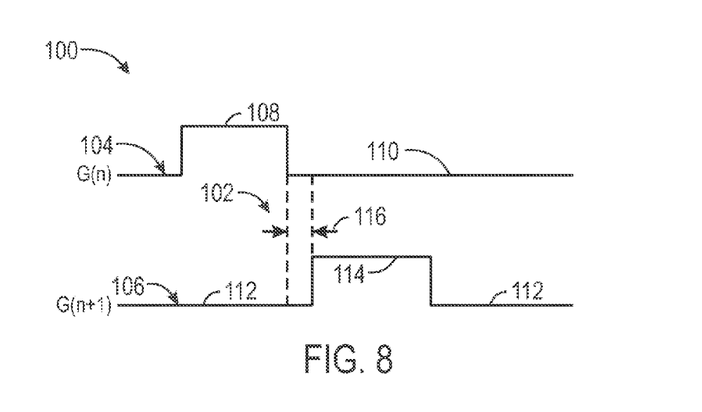
FIG. 8 is a graph illustrating a gate clock overlap as an operating parameter of the display of FIG. 4 in accordance with aspects of the present disclosure.

Additionally, FIG. 8 illustrates graph 100 depicting an embodiment of measuring an operating parameters as a gate clock overlap 102 of the display 12. Specifically, the graph 100 includes a first signal 104 and a second signal 106. In some embodiments, the first signal 104 may be a signal sent from the DDIC 52 to the display circuitry 48, and the second signal 106 may be a signal sent from the TIC 54 to the touch sensing circuitry 50. Alternatively, in other embodiments, the first signal 104 and the second signal 106 may represent signals from the same component (e.g., DDIC 52) at different periods. The first signal 104 includes an active state 108 and an inactive state 110. Similarly, the second signal 106 includes an inactive state 112 and an active state 114. To increase performance, it may be desirable to reduce the gate clock overlap 102 by reducing the duration 116 (i.e., period of both signals 104 and 106 being in inactive states) between the active states 108 and 114. At other times, due to certain factors (e.g., temperature, processor load), it may be desirable to increase the gate clock overlap 102 by increasing the duration 116.

In other embodiments, another operating parameter to be obtained may be the source voltage parking of the Vcom_Tx, Vcom_Rx, and Vcom_Gs. These voltages may be maintained (parked) at certain levels reduce current leakage to the display circuitry 48 during the touch sensing state, thereby reducing artifacts in the display during the touch sensing state. In such embodiments, it may desirable to modify voltages at which the source voltages are parked in response to certain conditions (e.g., temperature, touch activity, display activity) to achieve a different response in the display. Each of these operating parameters discussed above may be utilized to determine desirable operating parameters for an adaptive display 12.

Figure 9:
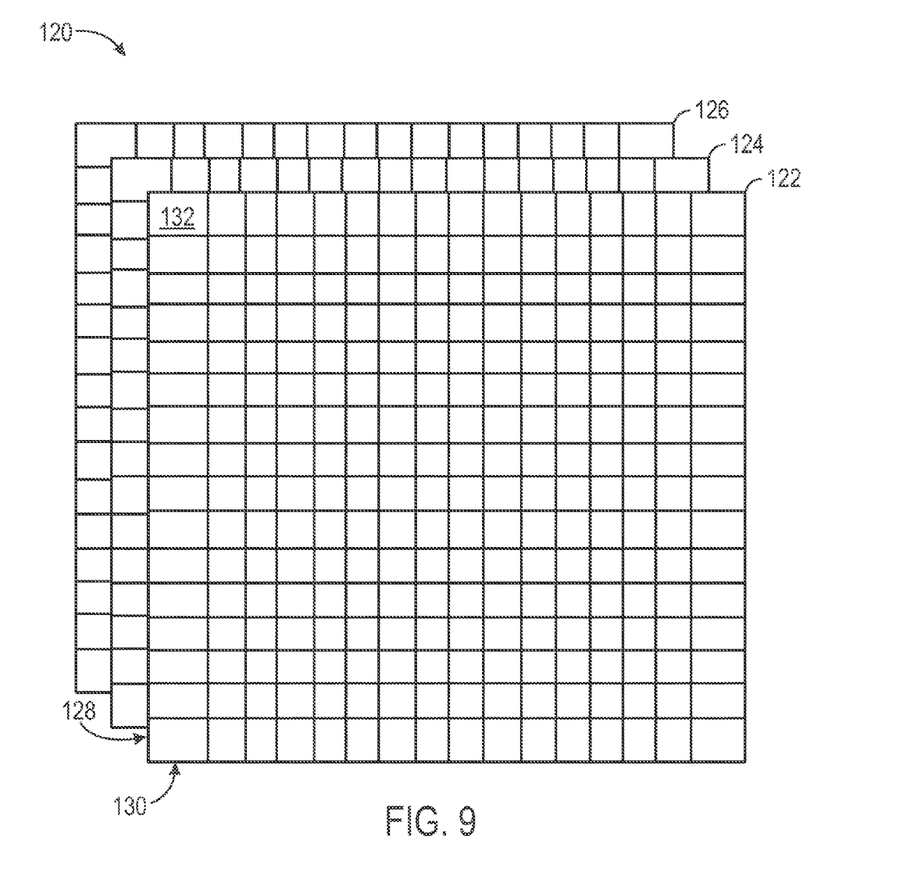
FIG. 9 is a schematic view of an embodiment of a multidimensional lookup table in accordance with aspects of the present disclosure.

Returning to FIG. 6, the method 80 further includes storing the desirable operating parameters as a range of values arranged by conditions in memory (block 86). As previously noted, these conditions (e.g., temperature, touch activity) may be the operating conditions under which the displays 12 are tested to obtain the performance characteristics in block 82. The desirable operating parameters corresponding to various conditions are stored in memory 46 according to the tested conditions in block 86, for example, in memory 46 using a suitable method of storing values. For example, the desirable operating parameters may be stored in a multi-dimensional lookup table 120, as depicted in FIG. 9. The multi-dimensional lookup table 120 of the illustrated embodiment includes a first page 122, a second page 124, and a third page 126. In some embodiments, the multi-dimensional lookup table 120 may include 1, 2, 3, or more pages. Additionally, each page consists of multiple rows 128 and columns 130 formed from an array of cells 132. In one embodiment, each page may correspond to an operating parameter (e.g., gate clock overlap) to be determined. Further, each row 128 for each page corresponds to a range of values for a condition (e.g., temperature) under which the display 42 is tested in block 82, and each column 130 may correspond to range of values for an additional tested condition (e.g., touch activity). In other words, each cell 132 contains a value that corresponds to a desirable operating parameter for specific ranges of two tested conditions.

To create the multi-dimensional lookup table 120 in accordance with the above-described embodiment, a page (e.g., first page 122) may be created for each operated parameter (e.g., slew rate 90). A row 128 then may be created for each of the ranges tested for a condition. A column 130 may be created for each of the ranges tested for another condition (e.g. various temperatures). Alternatively, in other embodiments, each page may be allocated a first tested condition with rows and columns respectively allocated to an operating parameter and a second tested condition. In the various embodiments, each cell 132 on each page contains a value for the operating parameter under the ranges of two tested conditions. Alternatively, the information stored in the cells 132 may include a string of data which may be applied to multiple operating parameters, decoded to be applied to different operating parameters, or a combination encoded and un-encoded data. In the various embodiments, after the creation of the multi-dimensional lookup table 120, values may be determined for each operating parameter under pre-tested ranges of each condition to obtain a desired display characteristic for each display 12 or to obtain uniformity of display characteristics between multiple displays 12.

Figure 10:
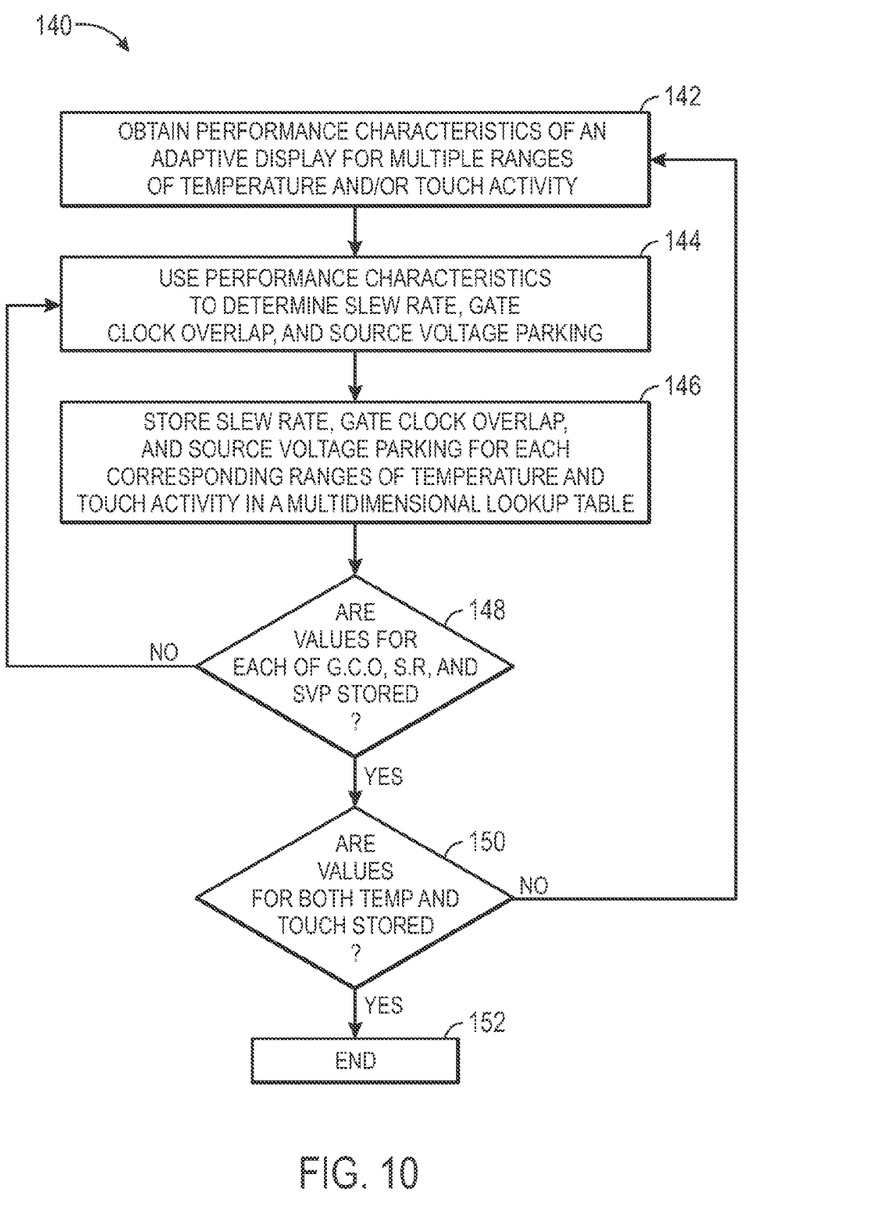
FIG. 10 is a flow chart of representative of storing operating parameters for driving the display of FIG. 4 in accordance with aspects of the present disclosure.

FIG. 10 is a flow chart of an embodiment of a detailed method 140 of storing operating parameters as depicted in FIG. 6. In the illustrated embodiment, the method 140 includes first obtaining the performance characteristics of an adaptive display 12 for multiple ranges of temperature and touch activity (block 142). As previously discussed, the performance characteristics pertain to various properties of the display 12 that may be tested at various intervals. In the current embodiment, the performance characteristics are obtained at multiple ranges for temperature and touch activity using testing. For example, tests to obtain the performance characteristics may include incrementally changing the temperature of the display 12 between during testing. Additionally, each test at each temperature may include incrementally changing the frequency of touch activity at each temperature. More specifically, in some embodiments, testing may include submitting the display 12 to a temperature of −20° C. then testing the display 12 using a relatively low touch activity frequency of 0.1 Hz. After determining all the desired performance characteristics, the frequency of touch activity may be increased to 0.2 Hz. After obtaining all the desired performance characteristics, the touch activity frequency may again be increased 0.3 Hz. The incremental testing at each subsequent frequency of touch activity may continue until the performance characteristics are obtained for each frequency of touch activity is tested. In other embodiments, the first tested frequency of touch activity may be anywhere between 0.001 Hz and 45 Hz with subsequently tested frequencies measured at regular/irregular intervals added or subtracted from the first tested frequency of touch activity.

After each of the desired performance characteristics are obtained for −20° C., the testing temperature may then be increased to −15° C. to perform the previously discussed incremental testing of the frequency of touch activity. The temperature may then be increased by regular or irregular intervals to determine the performance characteristics at each of the desired tested temperatures for each frequency of touch activity to be tested. For example, in one embodiment, the performance characteristics may be obtained at −20° C., 0° C., 20° C., 25° C., 27° C., 30° C., 35° C., 50° C., and 75° C. Additionally, the performance characteristics may be obtained first at the highest temperature to be tested (e.g., 75° C.) then incrementally tested by decreasing by regular/irregular increments until tested at the lowest desired testing temperature is reached. Furthermore, the temperature may be measured using various methods. In certain embodiments, the temperature may be measured using the temperature sensor 30. In some embodiments, the temperature may be measured by a sensor separate from the electronic device 10. The temperature measured may be the temperature of the display 12, the ambient temperature around the electronic device 10, or the temperature inside the electronic device 10.

Although certain embodiments obtain performance characteristics for multiple ranges of temperature and touch activity, other embodiments may obtain the performance characteristics under other tested conditions. For example, some embodiments may obtain the performance characteristics of the display 12 under various display activities (e.g., higher and lower refresh rates). Other embodiments may obtain the performance characteristics in relation to the temperature alone or the touch activity alone. Further embodiments may obtain the performance characteristics in relation to any combination of the display activity, touch activity, and temperature.

As illustrated in FIG. 10, after the performance characteristics are obtained in block 142, the performance characteristics are used to determine the slew rate 90, gate clock overlap 102, or source voltage parking for the obtained performance characteristics (block 144). Certain embodiments determine the operating parameters by manipulating one parameter (e.g., slew rate 90) while maintaining other parameters at a constant value to determine the effect on the performance of the display 12 under the tested condition. Thus, each of the optimal value(s) for an operating parameter may be determined experimentally. Alternatively, other embodiments may determine the optimal value(s) for an operating parameter using calculations involving the performance characteristics for the display 12.

After the slew rate, gate clock overlap, or source voltage parking values are obtained in block 144, the corresponding values are stored in a multi-dimensional lookup table 120 (block 146). For example, in certain embodiments, the values for slew rate 90 are determined in block 144 for various temperatures and touch activities. A page 122 is created and associated with the slew rate 90. Within the page 122, a row 128 is created and associated with the tested performance characteristics for each tested temperature range. For example, if the performance characteristics are obtained at −20° C., 0° C., 20° C., 25° C., 27° C., 30° C., 35° C., 50° C., and 75° C., the first row may correspond to any temperature below −10° C. Similarly, the second row may correspond to any temperature greater than or equal to −10° C. and less than 10° C. Thus, each row 128 may associated with a temperature with a range of values tested in block 142. Additionally, a column 130 is created and associated with each range of frequencies of touch activity tested in block 142. For example, the first column may correspond to a touch activity frequency less than 0.15 Hz and, the second column may correspond to a frequency of touch activity greater than or equal to 0.15 Hz and less than 0.25 Hz. Similarly, each column may be associated with a touch activity range as tested in block 142. Accordingly, each cell 132 may be associated with a particular range of temperatures and touch activities. Specifically, in the current embodiment, the cell in the first row and first column may correspond to a temperature below −10° C. and a touch activity below 0.1 Hz. Within each cell 132 on page 122, the value for a desired slew rate 90 is stored for a temperature range and a touch activity range. Each cell is populated with values until page 122 is fully populated.

After storing a set of values corresponding to an operating parameter, the method 140 includes determining whether values are determined and stored for the slew rate 90, gate clock overlap 102, and source voltage parking (block 148). In certain embodiments, block 148 may make this determination by verifying that a page in the multi-dimensional lookup table 120 is created for each desired parameter. If values for each of the parameters are not determined, the process returns to block 144 to determine the value for another operating parameter (e.g., gate clock overlap 102). After vales are determined for a new operating parameter, in block 146, a new page 124 is created and associated with the newly determined operating parameter.

As previously discussed, the page 124 is populated with rows 128 corresponding to temperature ranges, columns 130 corresponding to touch activity ranges, and cells 132 of values corresponding to the operating parameter under a specific temperature range and touch activity range. If the DDIC 52 in block 148 determines that values are stored for the slew rate 90, gate clock overlap 102, and source voltage parking, the DDIC 52 in determines whether values are stored for each of the desired temperature and touch activity ranges (block 150). In certain embodiments, DDIC 52 in block 150 may make this determination by verifying that a value is stored in each of the cells 132 on each page. If the DDIC 52 determines that a value is stored for all desired temperature and touch activity ranges, the method 140 ends (block 152). However, if DDIC 52 in block 150 determines that a value is not determined for each desired temperature and touch activity ranges, the process is returned to block 144 to determine the missing values. Alternatively, a negative return in block 150 may cause the DDIC 52 to clear the multi-dimensional lookup table 120 to begin the method 140 from an initial state.

Further, the illustrated embodiment includes obtaining performance characteristics for multiple ranges of temperature and touch activity. Certain embodiments may determine the performance characteristics corresponding to ranges of one or more of the following conditions: display activity, temperature, touch activity, processor load, power load, user-defined settings, application being performed by the electronic device 10 (e.g., watching movie or playing games), and battery life of the electronic device 10. Additionally, certain embodiments may determine and store values for slew rate 90, gate clock overlap 102, source voltage parking, or any combination thereof. Moreover, some embodiments may omit block 148 and/or block 150 by populating empty cells 132 with some default value. In certain embodiments these default values may be stored in a dedicated cell, row, column, or page to be duplicated to unpopulated cells. In other embodiments, an unpopulated cell may be populated with a value equivalent to a value in cell adjacent to the unpopulated cell, a value determined from an average of the surrounding cells, or a default value for each operating parameter stored in memory outside the multi-dimensional lookup table 120.

Figure 11:
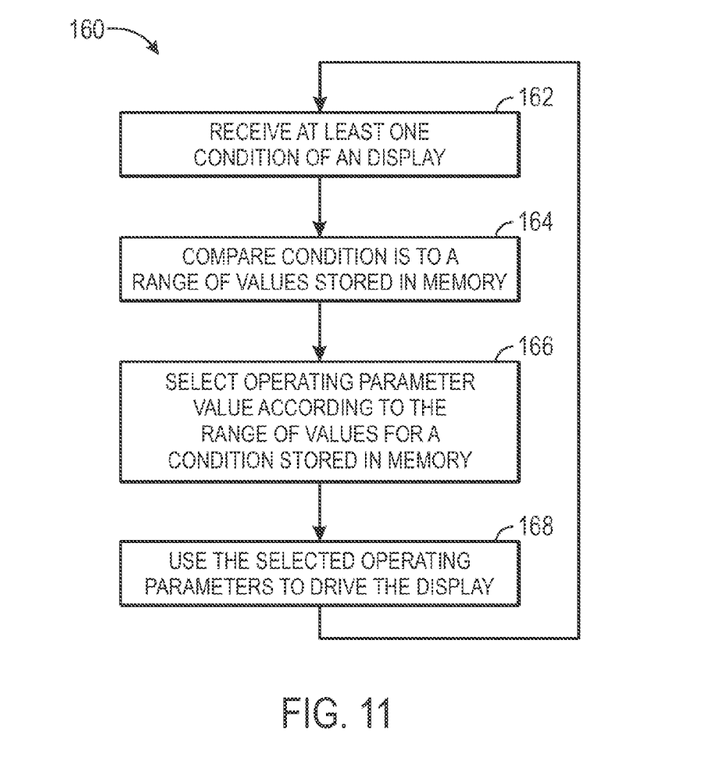
FIG. 11 is a flow chart representative of selecting operating parameters from memory for driving the display of FIG. 4 in accordance with aspects of the present disclosure.

FIG. 11 is a flow chart representative of a method 160 for selecting operating parameters from the memory 46 for driving the display 12. The method 160 includes receiving at the controller 44 at least one condition (e.g., temperature) relating to the display 12 (block 162). Block 162 may include receiving at least one condition from the temperature sensor 30, the DDIC 52, TIC 54, the processor 18, memory 20 of the electronic device 10, or other electronic components. In certain embodiments, at least one condition is received at the controller 44 at the initial startup of the device 10 or at the startup of a particular application (e.g., a movie is started). In other embodiments, one or more conditions may be determined periodically during the use of the device 10. After receiving at least one condition, the condition(s) (e.g., temperature) is compared to a range of values stored (e.g., temperature less than −15° C.) in the memory 46 for the controller 44 (block 164) by, for example, the DDIC 52. Next, method 160 includes selecting a value for an operating parameter(s) (e.g., the slew rate 90) according to a range of values stored in the memory 46 (block 166). The selected value(s) of the operating parameter(s) is used to drive the display 12 and may be selected by, for example, the DDIC 52 (block 168). In the illustrated embodiment, the process begins again at block 162 after some duration of time. In some embodiments, the duration may relatively small. In other words, in such embodiments, the controller 44 essentially continually performs blocks 162, 164, 166, or 168. In other embodiments, the duration may be longer to allow more efficient use of power and the processor 18. Further, some embodiments may receive the conditions upon certain occasions. For example, certain embodiments may include receiving the temperature when the temperature sensor 30 detects that the measured temperature has increased or decreased beyond a threshold (e.g., division between each range of values in memory).

Figure 12:
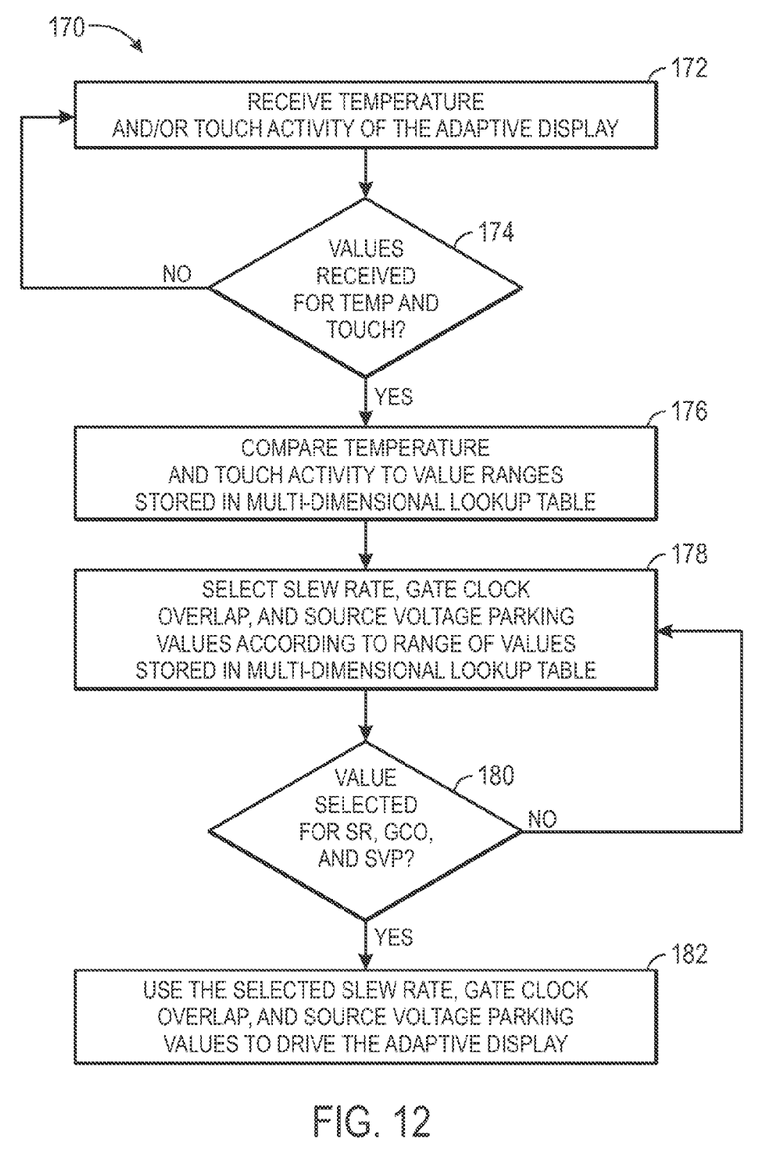
FIG. 12 is a second flow chart representative of selecting operating parameters from memory for driving the display of FIG. 4 in accordance with aspects of the present disclosure.

FIG. 12 is a second flow chart representative of selecting operating parameters from memory 46 for driving the display 12 that describes the steps of FIG. 11 in greater detail. The method 170 includes the controller 44 receiving a temperature measurement from the temperature sensor 30 (e.g., 21° C.) and/or receiving touch activity (e.g., 0.3 Hz). In some embodiments, the touch activity may be received by a controller 44 from the processor 18, TIC 54, or other electronic components. After receiving the touch activity or the temperature, a query determines whether a value has been received the temperature and the touch activity (block 174). If the controller 44 determines that a value has not been received for the temperature and touch activity, the controller 44 returns to block 172 to determine the missing value(s).

If the controller 44 determines that both values have been received, the values are compared to temperature and touch activity value ranges stored in the multi-dimensional lookup table 120 (block 176). As previously discussed, in certain embodiments, the multi-dimensional lookup table 120 may associate temperature value ranges to specific rows 128 of the multi-dimensional lookup table 120. For example, the first row may correspond to temperatures below −15° C. Such may also associate touch activity value ranges to specific columns 130 of the multi-dimensional lookup table 120. For example, the first column may correspond to touch activity occurring less frequently than 0.1 Hz. Accordingly, each cell 132 corresponding to a specific range of temperatures and frequency of touch activity. Furthermore, such embodiments of the multi-dimensional lookup table 120 include multiple pages with each page being allocated to an operating parameter. For example, values for the slew rate 90 and the gate clock overlap 102 may be stored on separate pages of the multi-dimensional lookup table 120.

After comparing the measured values for the touch activity and temperature to ranges of values stored in memory, a desired value is selected for the slew rate 90, gate clock overlap 102, and/or source voltage parking, for example, by the DDIC 52 (block 178). Specifically, the value is selected by choosing the page associated with the operating parameter (e.g., the slew rate 90). Similarly, a row corresponding to the proper temperature range and touch activity range are chosen. For example, if the temperature received in block 142 is 21° C., a temperature range from 10° C. to 22° C. may be selected. In some embodiments, the selected temperature range may correspond to the third row of the multi-dimensional lookup table 120. Likewise, if the frequency of the touch activity received in block 142 is 0.3 Hz, a touch activity range from 0.25 Hz to 0.35 Hz may be selected corresponding to the third column of the multi-dimensional lookup table 120. Accordingly, the value for operating parameter (e.g., the slew rate 90) may be selected as the value stored in the cell located at the intersection of the third column with the third row of the page corresponding to the operating parameter.

Once a value has been selected for one or more of the slew rate 90, gate clock overlap 102, and/or source voltage parking, the controller 44 may determine whether a value has been selected for the slew rate 90, gate clock overlap 102, and source voltage parking (block 180). If the controller 44 (block 180) determines that there is at least one operating parameter that has no value selected, the controller 44 may return to block 178 to select a value for the operating parameter. If the controller 44 determines that each operating parameter has had a value selected, the controller 44 drives the display 12 using the values selected for the slew rate 90, gate clock overlap 102, and source voltage parking (block 180). For example, at elevated temperatures, it may be desirable to increase the gate clock overlap 102 or decrease the slew rate 90 to reduce stress on the electrical components of the electronic device 10. Additionally, it may be desirable to reduce the duration of the touch sensing state and/or increase the duration of the display state when the touch activity is minimal, the display activity is substantial, or a movie application is selected. Similarly, it may be desirable to reduce the duration of the display state and/or decrease the duration of the touch sensing state when the touch activity is substantial, the display activity is minimal, or a game application is selected.

Some embodiments may omit block 174. In such embodiments, a default temperature or touch activity value may be used to select the operating parameters. Furthermore, certain embodiments may omit block 180. In such embodiments, any operating parameter (e.g., the slew rate 90) that has no selected value may be driven at a default value. In some embodiments, this default value may be stored in a dedicated location for default values in the multi-dimensional lookup table 120, outside the multi-dimensional table in memory 46, or simply be the previous/current value for the operating parameter.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method of manufacturing a display comprising:
   obtaining display characteristics of a display for a plurality of frequency ranges of touch activity;
   determining a value for at least one operating parameter based on the display characteristics for each of the plurality of frequency ranges; and
   storing each value in a lookup table, wherein the lookup table associates each value to a respective one of the frequency ranges.

2. The method of claim 1, wherein the display characteristics comprise picture quality, brightness, contrast ratio, response time, or display lag of the display, or any combination thereof.

3. The method of claim 1, wherein the at least one operating parameter comprises a gate clock overlap, a slew rate, or a source voltage park.

4. The method of claim 1, wherein obtaining the display characteristics comprises obtaining the display characteristics from a model from a batch of displays containing the display and the model.

5. A method of manufacturing a display comprising:
   obtaining display characteristics of a display for a plurality of temperature ranges and for a plurality of frequency ranges of touch activity;
   determining a value for at least one operating parameter based on the display characteristics for each of the plurality of temperature ranges and for each of the plurality of frequency ranges; and
   storing each value in a lookup table, wherein the lookup table associates each value to a respective one of the plurality of temperature ranges and to a respective one of the frequency ranges.

6. The method of claim 5, wherein the display characteristics comprise picture quality, brightness, contrast ratio, response time, or display lag.

7. The method of claim 5, wherein the at least one operating parameter comprises a gate clock overlap, a slew rate, or a source voltage park.

8. The method of claim 5, wherein the lookup table is a multi-dimensional look-up table.

9. A method of using a display comprising:
   receiving a temperature and a frequency of touch activity;
   comparing the received temperature and frequency of touch activity to a range of values stored in a lookup table;
   selecting at least one operating parameter value for the display from the range of values; and
   driving the display using the at least one operating parameter.

10. The method of claim 9, wherein the at least one operating parameter comprises a gate clock overlap, a slew rate, or a source voltage park.

11. The method of claim 9, wherein the lookup table is a multi-dimensional look-up table.

12. An electronic device comprising:
    one or more processors;
    one or more input structures configured to transmit input signals to the one or more processors;
    a display operably coupled to the one or more processors, wherein the display comprises:
      a screen comprising display circuitry and touch sensing circuitry, wherein the operation of the display circuitry and the touch sensing circuitry are multiplexed;
      a controller comprising:
        a display driver configured to drive the display circuitry;

a touch driver configured to drive the touch sensing circuitry; and a memory unit configured to store an operating parameter for the display corresponding to a range of values determined for a temperature and frequency of touch activity;

wherein the controller is configured to drive the display using the operating parameter.

13. The electronic device of claim 12, wherein the operating parameter comprises a gate clock overlap, a slew rate, or a source voltage park.

14. The electronic device of claim 12, wherein the memory unit is located within a general memory for the electronic device.

15. The electronic device of claim 12, wherein the memory unit is located within the controller and separate from a general memory for the electronic device.

16. The electronic device of claim 12, wherein the memory unit is located within a memory located within the display and separate from a general memory for the electronic device.

17. The electronic device of claim 12 comprising a temperature sensor configured to determine the temperature.

18. A system for controlling a display comprising:

a touch driver configured to drive a touch sensing circuit of the display;

a display driver configured to drive a display circuit of the display; and a memory unit configured to store an operating parameter corresponding to a range of values for a temperature and a frequency of touch activity affecting the display, wherein, the display driver is configured to use the operating parameter to drive the display circuit of the display.

19. The system of claim 18, wherein the memory unit comprises a lookup table.

20. The system of claim 18, wherein the operating parameter comprises a gate clock overlap, a slew rate, or a source voltage park.

* * * * *